United States Patent Office 3,033,858
Patented May 8, 1962

3,033,858
21-DESOXY-ALDOSTERONE
Tadeus Reichstein, Weissensteinstrasse 22, Basel, Switzerland, Albert Wettstein, Georg Anner, Jean-Rene Billeter, and Karl Heusler, Basel, Robert Neher, Binningen, Julius Schmidlin, Basel, Hellmut Ueberwasser, Riehen, and Peter Wieland, Basel, Switzerland, assignors to said Tadeus Reichstein
No Drawing. Filed Sept. 10, 1959, Ser. No. 839,086
Claims priority, application Switzerland Jan. 15, 1954
3 Claims. (Cl. 260—239.55)

This is a continuation in part of our copending application Serial No. 480,061, filed January 5, 1955, now U.S. Patent No. 2,904,545.

The object of the present invention is to provide a new 18-oxygenated steroid of the formula

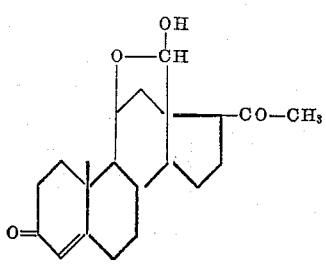

and its functional derivatives, such as esters, ethers, ketals, enol esters and ethers and their corresponding thio derivatives, for example, thio-esters, thio-ethers, thioketals, further hydrazones, oximes and other amino derivatives such as enamines. Compounds of this type possess valuable pharmacological properties and more particularly they show anabolic and gestagenic properties. They can therefore be used as medicaments for the treatment of all those conditions which require an enhanced formation of proteins, such as underweight and asthenia after operations, or in the geriatric field and also in disturbances of the normal sexual cycle of the female. Alternatively the compounds of the invention can be used as intermediates for the manufacture of other physiologically active products. Thus, the free (18:11)-cyclosemiacetal of the above formula can be oxidized, for instance with the aid of pyridine-chromium trioxide or chromic acid in glacial acetic acid, to the (18→11β)-lactone of the $\Delta^4$-3,20-dioxo-11β-hydroxy-pregnene-18-acid, which also shows anabolic activity.

The said compounds can be obtained from the corresponding 21-hydroxy derivatives with a protected 18-hydroxyl group, that is to say, from 18-esters or ethers of aldosterone or its ketonic derivatives, by esterifying the 21-hydroxyl group with an organic sulfonic acid or with a hydrohalic acid, reacting the so-obtained 21-ester with an alkali metal iodide and reductively removing the iodine atom in 21-position thus introduced; finally the protecting group in 18-position as well as other functionally converted groups may be set free according to methods known per se.

The esterification of the hydroxyl group in 21-position is preferably performed with a sulfonic acid chloride, such as p-toluene sulfonic acid chloride. In this case a mixture of the 21-sulfonate and of the 21-halide is obtained and the mixture can be used as such for the further conversion with an alkali metal iodide. There can also be used inorganic acid chlorides such as thionyl chloride or phosphorus oxychloride for the esterification in 21-position and in this case the 21-chlorides are obtained. The conversion of the 21-esters into the 21-iodides is generally performed with sodium or potassium iodide in acetonic solution and for the removal of the 21-iodine atom there is preferably used nascent hydrogen, such as is developed by the interaction of an acid with a metal, especially by treatment with zinc and acetic acid.

The starting materials can be obtained as described in U.S. Patent 2,862,925 filed September 8, 1954, by Tadeus Reichstein et al.

When in the compounds obtained by the above treatment the 18-hydroxyl group is set free by a method known per se, for instance, by alkaline or acidic hydrolysis, it can then again be esterified or etherified also by methods known per se. As esterifying agents there are suitable any organic or inorganic acids, such as aliphatic, alicyclic, araliphatic, aromatic or heterocyclic, carboxylic, thioncarboxylic, thiolcarboxylic, or sulfonic acids, formic acid, acetic acid, chloroacetic acid, trifluoroacetic acid, preferably acids having more than two carbon atoms, as propionic acid, butyric acids, valeric acids, trimethyl acetic acid, diethylacetic acid, caproic acids, oenanthic acids, caprylic acids, palmitic acids, crotonic acid, undecanic acid, undecylenic acid, oxalic acid, succinic acid, pimelic acid, maleic acid, lactic acid, carbamic acid, alkoxy carboxylic acids, β-cyclopentylpropionic acid, hexahydrobenzoic acid, benzoic acid, phenyl-acetic acid, cyclohexylacetic acid, phenylpropionic acids, trimethyl gallic acid, phthalic acid; furane-2-carboxylic acid, isonicotinic acid, methane sulfonic acid, toluene sulfonic acid, sulfuric acids, hydrohalic acids or phosphoric acids.

For the etherification, any alcohol of the aliphatic, alicyclic, araliphatic, aromatic or heterocyclic series, preferably those having from one to eight carbon atoms, may be employed. The residues thus introduced into the hydroxyl group may be an alkyl such as a methyl, ethyl, propyl or butyl group or an araliphatic group such as benzyl, the di- or triphenyl methyl group or also a tetrahydropyranyl group or the residues of the corresponding thioethers.

The new compounds can be used as medicaments, for example, in the form of pharmaceutical preparations which contain the compounds in admixture with a pharmaceutical organic or inorganic carrier substance suitable for enteral, or parenteral administration. For making the carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other carriers known for medicaments. The pharmaceutical preparations may be in the form, for example, of tablets, dragees, or in liquid form as solutions, suspensions or emulsions. If desired, they may be sterilized and/or may contain auxiliary substances, such as preserving, stabilizing, wetting or emulsifying agents, salts for regulating the osmotic pressure or buffers. They may also contain other therapeutically active substances. The content of the active substances in these preparations is preferably varying in the range from 0.001% to 50% or from 0.05 mg. to about 300 mg. per dosage unit.

The following example illustrates the invention:

Example 20.1 mg. of 18:11-cyclosemiacetal-18-monoacetate of $\Delta^4$-3:18:20-trioxo-11β:21-dihydroxy-pregnene are dissolved, in a dry nitrogen atmosphere, in 1.5 cc. of a 0.05-molar solution of pyridine in anhydrous chloroform, 14.5 mg. of purest p-toluene sulfonic acid chloride added and after placing under vacuum and well mixing, the whole allowed to stand for 48 hours at room temperature. The reaction mixture is then diluted with chloroform and ether, washed with 0.5-N-hydrochloric acid, 0.1-N-sodium bicarbonate solution and water, dried with sodium sulfate and the solution evaporated. The residue is dissolved in benzene and chromatographed over 1.0 gm. of aluminum oxide by the fractional elution method. The fractions removed with pure ether and ether-ethyl acetate (3:1) crystallize from acetone-ether. They constitute mixtures of 21-chloride and 21-tosylate and are subjected together to the subsequent reaction with sodium iodide.

12.8 mg. of this resulting mixture and 75 mg. of sodium iodide are boiled in 1.0 cc. of acetone for 6 minutes with exclusion of moisture. Thereupon the whole is cooled in ice water and evaporated under vacuum. The residue is immediately taken up in 0.3 cc. of glacial acetic acid, the suspension decolorized by rinsing round with a trace of zinc dust and then again evaporated under vacuum. Water is then added and extraction carried out by shaking with chloroform-ether (1:3). The combined extracts are washed with 0.3 N-hydrochloric acid, 0.1 N-sodium bicarbonate solution and water, dried with sodium sulfate and evaporated. The remaining pale yellow lacquer is dissolved in benzene and chromatographed over 0.5 gm. of aluminum oxide. The fractions removed with benzene-ether (1:1), pure ether and ether-ethyl acetate (9:1), give from acetone-ether pure 18:11-cyclosemi-acetal-18-monoacetate of $\Delta^4$-3:18:20-trioxo-11$\beta$-hydroxy-pregnene.

What is claimed is:
1. A member selected from the group consisting of a compound of the formula

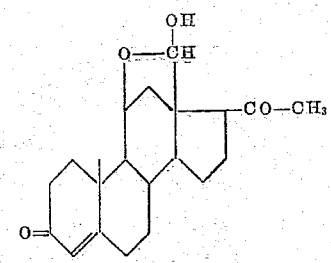

its 18-esters and its 18-ethers.

2. The (18:11)-cyclosemiacetal of $\Delta^4$-3:18:20-trioxo-11$\beta$-hydroxypregnene.

3. The 18-acetate of the (18:11)-cyclosemiacetal of $\Delta^4$-3:18:20-trioxo-11$\beta$-hydroxypregnene.

References Cited in the file of this patent
UNITED STATES PATENTS

| | | |
|---|---|---|
| 2,713,587 | Bergstrom | July 19, 1955 |
| 2,844,513 | Wettstein et al. | July 22, 1958 |
| 2,852,529 | Poos | Sept. 16, 1958 |